United States Patent
Naito et al.

(10) Patent No.: US 8,065,134 B2
(45) Date of Patent: Nov. 22, 2011

(54) MULTI-LINGUAL INFORMATION DISPLAY SYSTEM COMPRISING PUBLIC AREA AND INDIVIDUAL AREAS

(75) Inventors: Hirohisa Naito, Kawasaki (JP); Takahiro Kii, Kawasaki (JP); Toru Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 12/185,429

(22) Filed: Aug. 4, 2008

(65) Prior Publication Data

US 2008/0294424 A1 Nov. 27, 2008

Related U.S. Application Data

(63) Continuation of application No. PCT/JP2006/302363, filed on Feb. 10, 2006.

(51) Int. Cl.
*G06F 17/20* (2006.01)
(52) U.S. Cl. .............................. 704/8; 704/270; 704/257
(58) Field of Classification Search ................ 704/1–10, 704/257, 270, 277; 345/7
See application file for complete search history.

(56) References Cited

U.S. PATENT DOCUMENTS

| | | | | |
|---|---|---|---|---|
| 5,436,436 | A * | 7/1995 | Matsukawa | 235/380 |
| 5,983,035 | A * | 11/1999 | Funaki | 396/281 |
| 6,061,646 | A * | 5/2000 | Martino et al. | 704/3 |
| 6,977,690 | B2 * | 12/2005 | Gomikawa | 348/468 |
| 7,595,740 | B2 * | 9/2009 | Pechenick et al. | 340/988 |
| 7,664,630 | B2 * | 2/2010 | Fukuoka et al. | 704/8 |
| 2001/0037192 | A1 * | 11/2001 | Shimamoto et al. | 704/8 |
| 2003/0126013 | A1 * | 7/2003 | Shand | 705/14 |
| 2003/0160706 | A1 * | 8/2003 | Endress et al. | 340/945 |
| 2003/0177014 | A1 * | 9/2003 | Crawford et al. | 704/276 |
| 2004/0085260 | A1 * | 5/2004 | McDavid, III | 345/7 |
| 2004/0230416 | A1 * | 11/2004 | Ye et al. | 704/5 |
| 2006/0058956 | A1 * | 3/2006 | Miyawaki et al. | 701/211 |
| 2006/0080083 | A1 * | 4/2006 | Lin et al. | 704/8 |
| 2008/0262883 | A1 * | 10/2008 | Weiss et al. | 705/7 |
| 2008/0300880 | A1 * | 12/2008 | Gelbman | 704/256 |
| 2010/0036728 | A1 * | 2/2010 | Pechenick et al. | 705/14.48 |

FOREIGN PATENT DOCUMENTS

| | | |
|---|---|---|
| JP | 2000-330918 | 11/2000 |
| JP | 2003-330697 | 11/2003 |
| JP | 2004-180097 | 6/2004 |

OTHER PUBLICATIONS

International Search Report (mailed May 30, 2006 for International Application No. PCT/JP2006/302363).

* cited by examiner

*Primary Examiner* — Huyen X. Vo
(74) *Attorney, Agent, or Firm* — Staas & Halsey LLP

(57) ABSTRACT

An information display system has an information display unit which displays information in a large screen display device in a predetermined standard language; a user information input unit which inputs user information including information of a language desired by a user; and a language switch display unit which, when the user desired language input by the user information input unit is different from the standard language, switches the standard language of the screen display device to and displays the desired language of the user. The information display unit displays guide information, which comprises a public area common to all users and a plurality of individual areas dependent on respective users, in the standard language. When the input user desired language is different from the standard language, the language switch display unit displays the public area by time division or space division by the standard language and the user desired language and switches the individual area from the standard language to and displays in the user desired language.

18 Claims, 22 Drawing Sheets

FIG. 4

| USER ID | NAME | ADDRESS | FLIGHT NO. | LANGUAGE | |
|---|---|---|---|---|---|
| 000001 | aaaa | AAAA | JAL715 | JAPANESE | |
| 000002 | bbbb | BBBB | JAL715 | JAPANESE | |
| 000003 | cccc | CCCC | JAL715 | ENGLISH | |
| 000004 | dddd | DDDD | JAL715 | ENGLISH | |
| 000005 | eeee | EEEE | JAL715 | CHINESE | |

FIG. 5B

| | | | |
|---|---|---|---|
| 17:50 | SL041 | ROME | SOL | C62 |
| 18:05 | AA014 | JAKARTA | ANA | E83 |
| 18:20 | FN305 | TALLINN | FIN | A43 |
| 18:55 | SL211 | DELHI | SOL | D72 |
| 19:05 | LA045 | STOCKHL | EL PASO | LA | A44 |
| 19:20 | AP304 | DUBAI | MIAMI | AP | C61 |
| 19:50 | TA079 | MOSCOW | TA | E82 |
| 20:10 | JL062 | MADRID | JAL | E86 |
| 20:25 | AC022 | GUAM | AC | B53 |
| 20:40 | AA687 | SEOUL | SAMUI | ANA | A41 |
| 21:00 | DL730 | NEWYORK | KINGSTONE | DEL | D73 |

22 JUNE *14:00*

72 INDIVIDUAL AREA

FIG. 6B

| | | | |
|---|---|---|---|
| 17:50 | SL041 | ROME | SOL | C62 |
| 18:05 | AA014 | JAKARTA | ANA | E83 |
| 18:20 | FN305 | TALLINN | FIN | A43 |
| 18:55 | SL211 | DELHI | SOL | D72 |
| 19:05 | LA045 | STOCKHL | EL PASO | LA | A44 |
| 19:20 | AP304 | DUBAI | MIAMI | AP | C61 |
| 19:50 | TA079 | MOSCOW | TA | E82 |
| 20:10 | JL062 | MADRID | JAL | E86 |
| 20:25 | AC022 | GUAM | AC | B53 |
| 20:40 | AA687 | SEOUL | SAMUI | ANA | A41 |
| 21:00 | DL730 | NEWYORK | KINGSTONE | DEL | D73 |

22 JUNE 14:00

| | | | 72 |
|---|---|---|---|
| 17:50 | SL041 | ROME | SOL | C62 |
| 18:05 | AA014 | JAKARTA | ANA | E83 |
| 18:20 | FN305 | TALLINN | FIN | A43 |
| 18:55 | SL211 | DELHI | SOL | D72 |
| 19:05 | LA045 | STOCKHL | EL PASO | LA | A44 |
| 19:20 | AP304 | DUBAI | MIAMI | AP | C61 |
| 19:50 | TA079 | MOSCOW | TA | E82 |
| 20:10 | JL062 | MADRID | JAL | E86 |
| 20:25 | AC022 | GUAM | AC | B53 |
| 20:40 | AA687 | SEOUL | SAMUI | ANA | A41 |
| 21:00 | DL730 | NEWYORK | KINGSTONE | DEL | D73 |

22 JUNE *14:00*

FIG. 13B

| | | | | |
|---|---|---|---|---|
| 17:50 | SL041 | ROME | SOL | C62 |
| 18:05 | AA014 | JAKARTA | ANA | E83 |
| 18:20 | FN305 | TALLINN | FIN | A43 |
| 18:55 | SL211 | DELHI | SOL | D72 |
| 19:05 | LA045 | STOCKHL | LA | A44 |
| 19:20 | AP304 | DUBAI | AP | C61 |
| 19:50 | TA079 | MOSCOW | TA | E82 |
| 20:10 | JL062 | MADRID | JAL | E86 |
| 20:25 | AC022 | GUAM | AC | B53 |
| 20:40 | AA687 | SEOUL | ANA | A41 |
| 21:00 | DL730 | NEWYORK KINGSTONE | DEL | D73 |
| SHOW DAPTURE TIME | 出発時刻 表示 | 出发时 表示 | MONTREZ LE TEMP DE DAPTURE | *14:00* |

72-11  72-12  72-13  72-14

} 72

MULTI-LINGUAL INFORMATION DISPLAY SYSTEM COMPRISING PUBLIC AREA AND INDIVIDUAL AREAS

This application is a continuation of PCT/JP2006/302363 filed Feb. 10, 2006.

TECHNICAL FIELD

The present invention relates to an information display system, an information display method, and a program used in guidance of facilities or sites of, for example, an airport terminal utilized by many people of different languages and particularly relates to an information display system, an information display method, and a program which automatically switch the display of guide information in a standard language to a desired language of a user acquired from a portable device of the user.

BACKGROUND ART

Conventionally, a standalone-type public display device which displays departure information by using a large display has been set in a departure terminal of an airport. If it is an airport of, for example, an English-speaking area, such a public display device is displayed in English as a display language. In order to support users of a plurality of different linguistic areas, some devices prepare buttons for a plurality of languages so that display is switched to the display of the language corresponding to the pressed button. In display control of contents such as movies corresponding to a plurality of languages, there are: a mechanism which carries out display in the language corresponding to a user according to setting by the user or the information embedded in a device, a device in which a plurality of language-corresponding buttons are provided and display is carried out in a language when the language is selected, and a device which displays embedded captions of a plurality of languages by time division.

Patent Document 1: Japanese Patent Application Laid-Open (kokai) No. H11-327725
Patent Document 2: International Publication No. WO-00-048082
Patent Document 3: Japanese Patent Application Laid-Open (kokai) No. 2003-345325
Patent Document 4: Japanese Patent Application Laid-Open (kokai) No. 2004-180097

However, in such conventional information display systems corresponding to a plurality of languages, when a particular user is using it, the display is in a particular language desired by the user, and the display cannot be understood if a user of a different language is watching it. Particularly, in the case of a public display device of, for example, an airport terminal, a plurality of users of different linguistic areas watch departure information, and there is a problem that, when the display is in the language of particular users, the information cannot be read at all if there is another user of a different linguistic area who is watching the display. In expectation of people of a plurality of linguistic areas who use the public display, displaying captions of a plurality of languages by time division is conceivable. However, there are problems that, when there are many languages to be supported, it takes time until the display appears in the language of the user, which is desired to be watched by the user; and, when the number of displayed languages is increased, the displayed time at a time has to be shortened. Furthermore, also in the case in which a language is selected by a button and also in the case in which captions are displayed by time division, there are a problem that the number of supported languages is practically limited and a problem that there is a lack of convenience as a public display device of, for example, an airport terminal where users of many linguistic areas come and go.

DISCLOSURE OF THE INVENTION

According to the present invention to provide an information display system, an information display method, and a program which display the information, which is required in an environment used by many non-particular people of different linguistic areas, in the language desired by a user and, at the same time, prevent another user watching the display from an adjacent area from becoming unable to read it.

(System)

The present invention provides an information display system. The information display system of the present invention is characterized by having a large screen display device;
an information display unit which displays information in the screen display device in a predetermined standard language;
a user information input unit which inputs user information including information of a language desired by a user; and
a language switch display unit which, when the user desired language input by the user information input unit is different from the standard language, switches all or part of the standard language of the screen display device to and displays the desired language of the user.

Herein, the information display unit displays guide information, which comprises a public area common to all users and a plurality of individual areas dependent on respective users, in the standard language; and, when the input user desired language is different from the standard language, the language switch display unit displays the public area by time division or space division by the standard language and the user desired language and switches the individual area from the standard language to and displays in the user desired language.

The language switch display unit displays accompanying information relevant to the user in the language of the user so as to correspond to the individual area switched to and displayed in the user desired language.

The language switch display unit subjects the individual area to display by a predetermined color, flicker display, or accompanying display of a symbol or a character with respect to the individual area corresponding to the user desired language in synchronization with the switch display to the user desired language, so as to draw attention of the user.

The language switch display unit causes the accompanying information to draw attention by an identification means equivalent to the individual area in synchronization with the switch display to the user desired language.

The language switch display unit causes the display of the user desired language among the standard language and the user desired language displayed by the time division or space division to draw attention by an identification means equivalent to the individual area in synchronization with the switch display to the user desired language.

The information display unit displays a list in a tabular form as the guide information, displays item names of items of a table as the public area of the list display, and displays a plurality of arrays of item values corresponding to the item names of the public area as the individual areas of the list display.

The information display unit displays a list of departure information of a transportation facility as the guide information, displays item names including, for example, departure time, flight number, route, destination, and company name as the public area of the list display, and displays a plurality of arrays of item values corresponding to the item names of the public area as the individual areas of the list display.

The information display unit displays a list of departure information of an airport as the guide information, displays item names including, for example, departure time, flight number, route, destination, company name, and gate number as the public area of the list display, and displays a plurality of arrays of item values corresponding to the item names of the public area in the order of departure time as the individual areas.

The information display unit displays a map of facilities as the guide information, displays at least a description on the guide map as the public area of the map information, and displays a position on the map desired by the user and information accompanying the position as the individual areas of the map information.

The information display unit displays a map showing boarding gates of an airport as the guide information, displays a title of the map, a current position, and a symbol description on the guide map as the public areas of the map, and displays information of the boarding gate to be used by the user as the individual area of the map.

The user information input unit reads information of the language desired by the user from an information device that the user carries. The user information input unit may read identification information of the user from an information device that the user carries, access a database managing the identification information, and acquire the information of the language desired by the user.

The user information input unit has a plurality of read units having menu screens for reading the user information, displays menu information in a plurality of languages including the standard language respectively in the plurality of menu screens, and, when the language determined by reading the user information by the read unit is different from the display language of the menu screen, displays the display language of the menu screen and the determined user desired language by time division or space division.

The user information input unit has a plurality of read units having menu screens for reading the user information, fixedly displays menu information in part of the menu screens of the plurality of read units in the standard language and a predetermined user desired language, and dynamically displays menu information in a frequently used user desired language in the rest of the plurality of menu screens of the read units.

When input of another user language is determined during display in the user desired language, the language switch display unit displays the public area by time division or space division by the standard language and the plurality of user desired languages and displays the individual area by time division or space division by the plurality of user desired languages.

The language switch display unit returns the display to the display of the standard language after a certain time period has elapsed after the display is switched to the display of the user desired language. The language switch display unit may detect that the user is away from the vicinity of the screen display device by a sensor and return the display of the user desired language to the display of the standard language.

(Method)

The present invention provides an information display method. The information display method of the present invention includes an information display step of displaying information in a large screen display device in a predetermined standard language;

a user information input step of inputting user information including information of a language desired by a user; and a language switch display step of, when the user desired language input in the user information input step is different from the standard language, switching all or part of the standard language of the screen display device to and displaying the desired language of the user; wherein, in the information display step, guide information, which comprises a public area common to all users and a plurality of individual areas dependent on respective users, is displayed in the standard language; and, when the user desired language is different from the standard language, in the language switch display step, the public area is displayed by time division or space division by the standard language and the user desired language and the individual area corresponding to the user is switched from the standard language to and displayed in the user desired language.

(Program)

The present invention provides an information display program. The information display program of the present invention causes a computer to execute an information display step of displaying information in a large screen display device in a predetermined standard language;

a user information input step of inputting user information including information of a language desired by a user; and a language switch display step of, when the user desired language input in the user information input step is determined to be different from the standard language, switching all or part of the standard language of the screen display device to and displaying the desired language of the user; wherein, furthermore, in the information display step, guide information, which comprises a public area common to all users and a plurality of individual areas dependent on respective users, is displayed in the standard language; and, when the user desired language is different from the standard language, in the language switch display step, the public area is displayed by time division or space division by the standard language and the user desired language and the individual area corresponding to the user is switched from the standard language to and displayed in the user desired language.

According to the present invention, in a large screen display device displaying guide information or the like of departure flights, for example, in an airport terminal, when information of a desired language of a user is determined by reading user information from an information device such as an IC card or a mobile phone that the user carries, the departure flight information of an individual area dependent on the user is displayed in the language desired by the user, and the languages of a public display area other than that are displayed by time division or space division by the originally displayed standard language and the language desired by the user; thus, in the environment used by many non-particular people, merely by preparing data, displays corresponding to the number of the prepared languages can be carried out, and, at the same time, displays supporting a plurality of languages that satisfy, at the same time, requirements of the user and many people watching information in the vicinity can be carried out. For example in the case in which the standard language is English, when a user of a Japanese-speaking area causes, for example, an IC card to be read, the public areas of, for example, item names in a list display of departure information is displayed by time division or space division of English and Japanese, and an individual area of the list display indicating the departure flight recognized from the user information is switched from English to Japanese display; thus, the display supporting the plurality of languages that satisfies, at the same time, requirements of the user of the Japanese-speaking area and many people of an English-speaking area watching the information in the vicinity can be carried out.

BRIEF DESCRIPTION OF DRAWINGS

FIG. 4 is an explanatory drawing of a user database of FIGS. 1A and 1B;

FIGS. 5A and 5B are explanatory drawings of a departure information screen which is displayed by using English as a standard language;

FIGS. 6A and 6B are explanatory drawings of a departure information screen in which approach of a user is detected by a human body sensor and menus are displayed;

FIGS. 7A and 7B are explanatory drawings of the departure information screen when Japanese is determined from user information;

FIGS. 13A and 13B are explanatory drawings in which menus are displayed in a plurality of languages in the departure information display screen;

BEST MODE FOR CARRYING OUT THE INVENTION

Figure 1A:
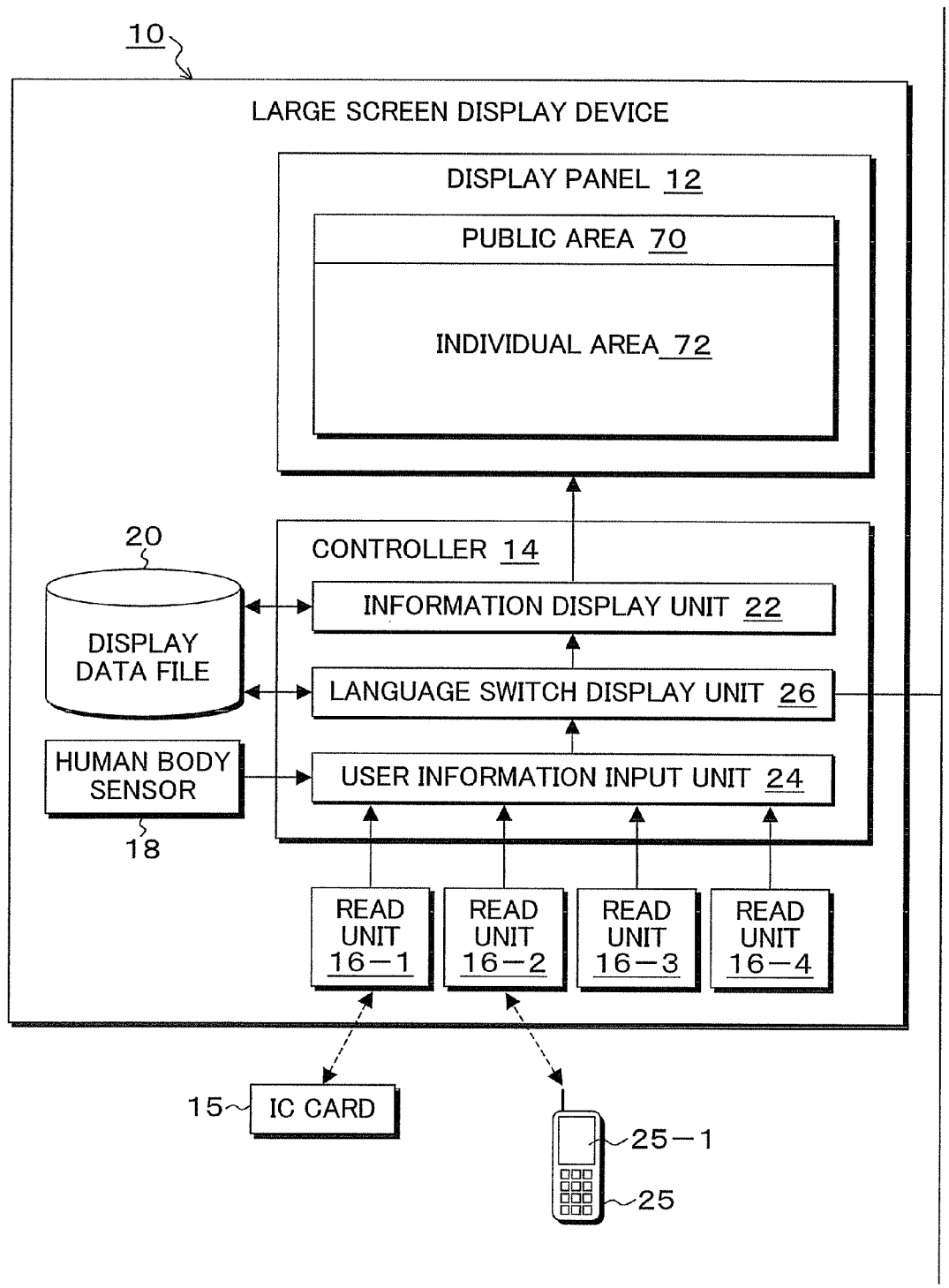
FIGS. 1A and 1B are block diagrams of an embodiment of an information display system which is an embodiment of the present invention.
Figure 1B:
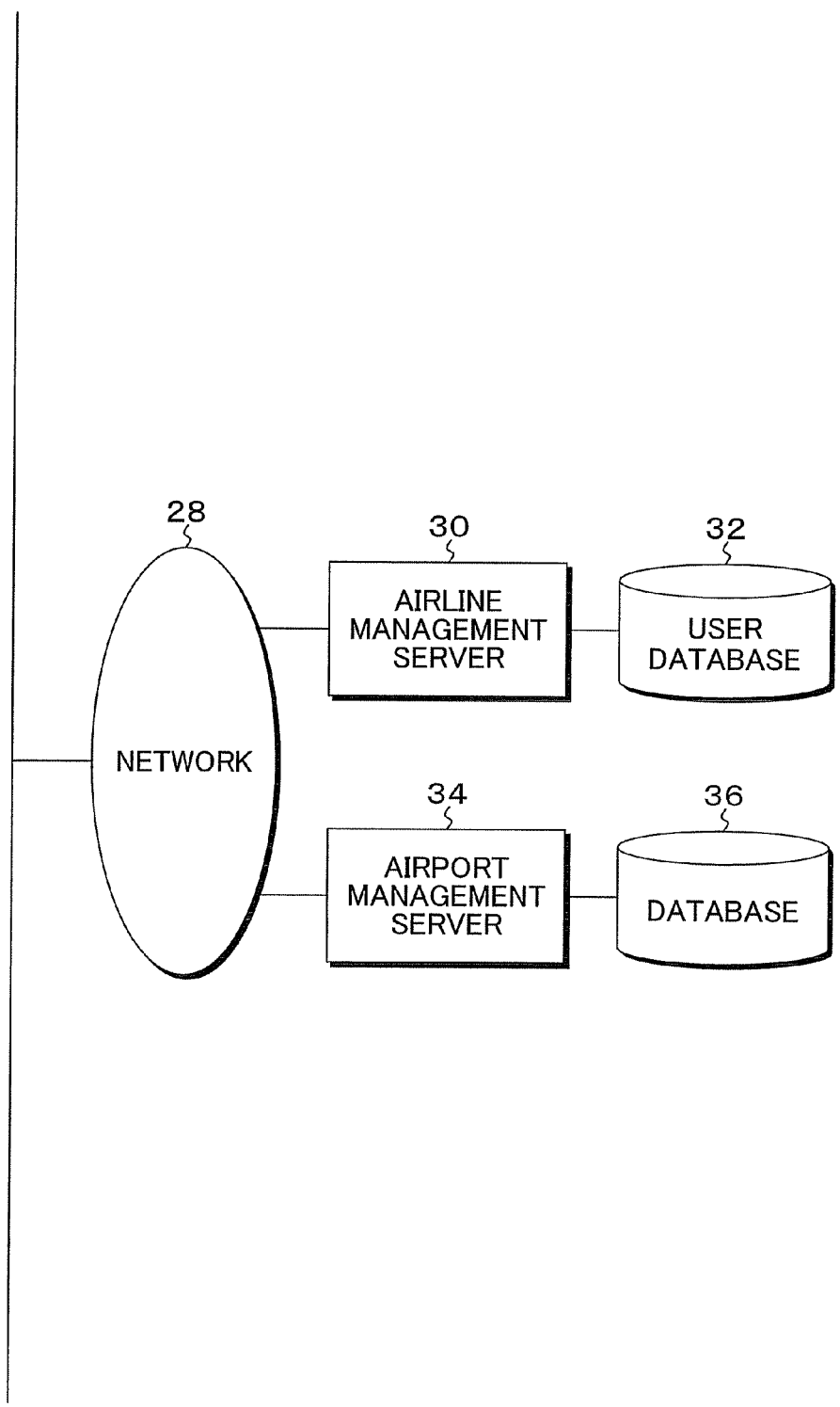

FIGS. 1A and 1B are block diagrams of an information display system according to an embodiment of the present invention. In FIGS. 1A and 1B, the present embodiment has a large screen display device 10, and the large screen display device 10 comprises a large-screen display panel 12, a controller 14, read units 16-1 to 16-4, a human body sensor 18, and a display data file 20. In the controller 14, an information display unit 22, a user information input unit 24, and a language switch display unit 26 are provided. In the present embodiment, the case in which it is set in a departure lobby of an airport terminal as the large screen display device 10 and displays departure information or a departure gate guide map is taken as an example. Therefore, the controller 14 of the large screen display device 10 is connected to an airline management server 30 and an airport management server 34 via a network 28, the airline management server 30 is provided with a user database 32, and the airport management server 34 is provided with a database 36 storing various airport management information including display information of the large screen display device 10. The display panel 12 of the large screen display device 10 displays guide information separately in a public area 70 and an individual area 72. The information displayed in the public area 70 is the information common to all users, on the other hand, the information of the individual area 72 is the information dependent on users. For example, when departure information is to be displayed in a list, item names such as departure time, flight numbers, routes, destinations, company names, and the like are displayed in the public area 70 of the list display. Corresponding to these, in the individual area 72 of the list display, a plurality of arrays of departure time, flight numbers, routes, destinations, company names, and the like which are specific item values of respective departure flights corresponding to the item names of the public area are displayed in the order of the departure time. The information display unit 22 provided in the controller 14 displays, for example, departure information in a predetermined standard language in the display panel 12. In the present embodiment, English is set as the standard language; therefore, the departure information of the public area 70 and the individual area 72 of the display panel 12 is displayed in English. The user information input unit 24 inputs use information including the information of the language desired by the user. In the present embodiment, the read units 16-1 to 16-4 are connected to the user information input unit 24, user information is read from, for example, a noncontact IC card 15 that a user has, and the desired language of the user is acquired based on the read user information. The IC card 15 is, for example, a mileage card of an airline company that a user who is to board an airplane has; and, when the user information is read from the mileage card, the user information input unit 24 can acquire at least a user ID. When the user ID can be acquired in this manner, the user information input unit 24 accesses the airline management server 30 via the network 28, acquires user information by searching the user database 32 according to the user ID, and reads the information of the language desired by the user therefrom so as to make a response, thereby acquiring the used language of the user who has the IC card 15 and to use the large screen display device 10. If the language information of the user is registered in the IC card 15 in advance, the language information of the user can be directly acquired from the read contents of the user information. Each of the read units 16-1 to 16-4 has a function as a reader of a terminal device such as a mobile phone 25 other than the IC card 15, acquires user information from the mobile phone 25, directly acquires the used language of the user if language information is included therein, and, if the used language is not included, acquires the used language of the user by access to the airline management server 30 based on acquisition of the user ID. When the desired language of the user input by the user information input unit 24 is different from the standard language set by the information display unit 22, the language switch display unit 26 switches the display in the standard language by the information display unit 22 to display in the desired language of the user. In the switching to the user language, display is carried out by time division or space division of the standard language and the user used language in the public area 70 of the display panel 12, meanwhile, in the individual area 72, the individual area of the departure flight which is desired by the user is switched to and displayed in the user language. In the present embodiment, as described above, English is displayed as a standard language; and, when Japanese is determined as the user language in the user information input unit 24, the public area 70 is displayed by time division or space division of English and Japanese, and the information of the departure flight corresponding to the user is switched from the previous English display to Japanese display in the individual area 72. Furthermore, when a plurality of users redundantly access a same departure flight, the language switch display unit 26 carries out display switching by the desired languages of the plurality of users. For example, when a user of Japanese and a user of German are using it at the same time, time division display or space division display of English, Japanese, and German is carried out in the public area 70, and the information of the corresponding departure flight of the individual area 72 is displayed by time division or displayed by space division of Japanese and German which are user languages. The human body sensor 18 detects users who are adjacent to the large screen display device 10 and displays, in the display panel 12, menus for read guidance respectively corresponding to the read units 16-1 to 16-4. In the display data file 20, display data of the public area 70 and the individual area 72 displayed in the display panel 12 by the information display unit 22 is stored. In the present embodiment, since departure information of airplanes is taken as an example, departure information including departure time, flight numbers, routes, destinations, company names, and the like in the order of departure time is stored in the display data file 20. The display data of the departure information of the display data file 20 is transferred and stored every time the departure information is edited/updated by the airport management server 34 and displayed in the corresponding areas of the display panel 12 by the information display unit 22. In addition, in the display data file 20, display data of each of the languages of the public area 70 and the individual area 72 corresponding to the used languages of the users subjected to switch display by the language switch display unit 26 is stored at the same time. The display data of each of the languages is prepared so that the languages which can be displayed in the present embodiment cover all the languages which may be used in an air terminal such as English, Japanese, German, French, Chinese, and Korean.

Figure 2:
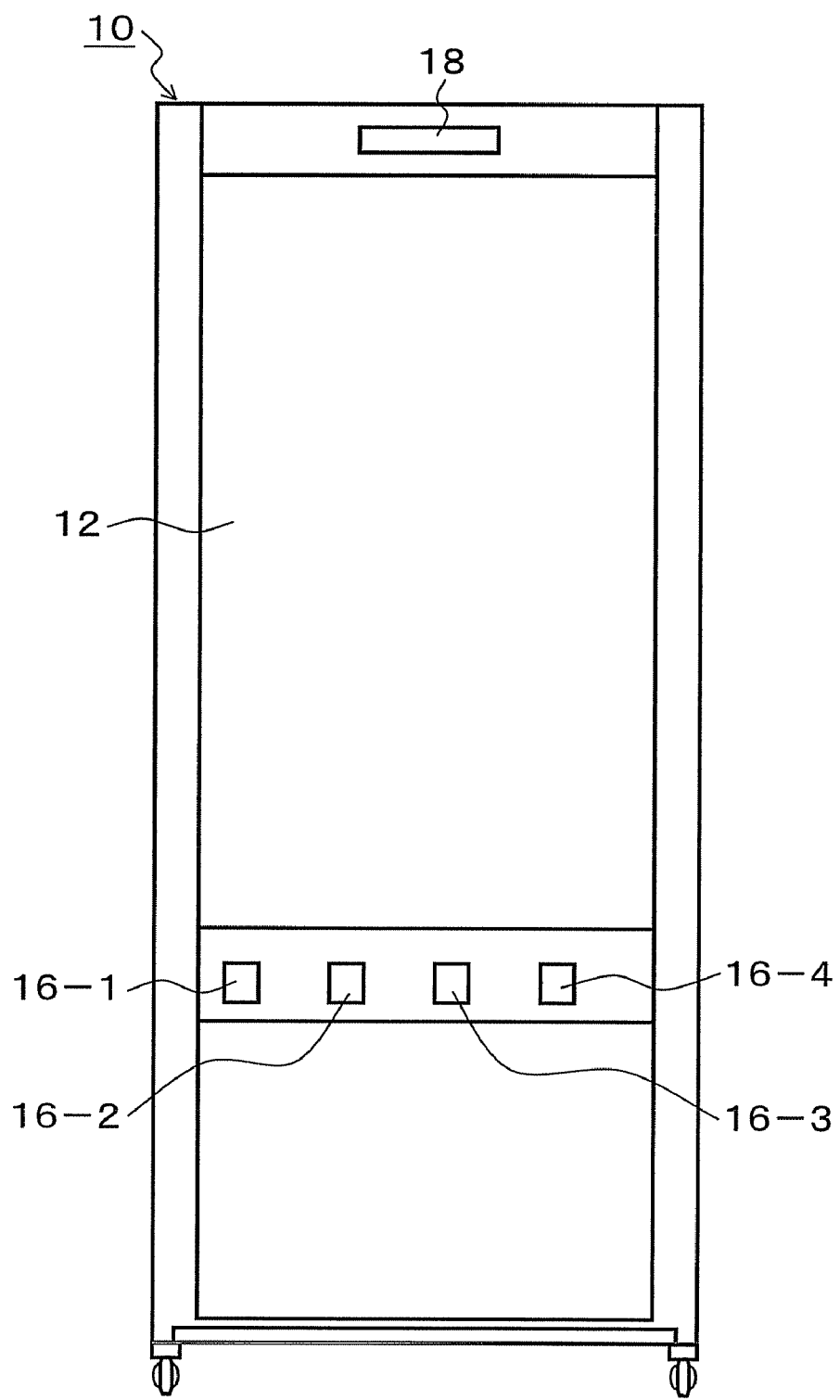
FIG. 2 is an external view explanatory drawing of a large screen display device of FIGS. 1A and 1B.

FIG. 2 is an external view explanatory drawing of the large screen display device 10 of FIGS. 1A and 1B. In FIG. 2, in the large screen display device 10, the display panel 12 is disposed in the front upper side; and, for example, a plasma display or liquid crystal display having a large size over 60 inches is used as the display panel 12. The human body sensor 18 is installed above the display panel 12. For example, a heat ray sensor having sensitivity in the infrared ray region is used as the human body sensor 18, and presence of a human is detected by detecting a differential change of heat rays caused by human movement. The read units 16-1 to 16-4 having reader functions of IC cards or communication functions with mobile phones are installed below the display panel 12.

Figure 3:
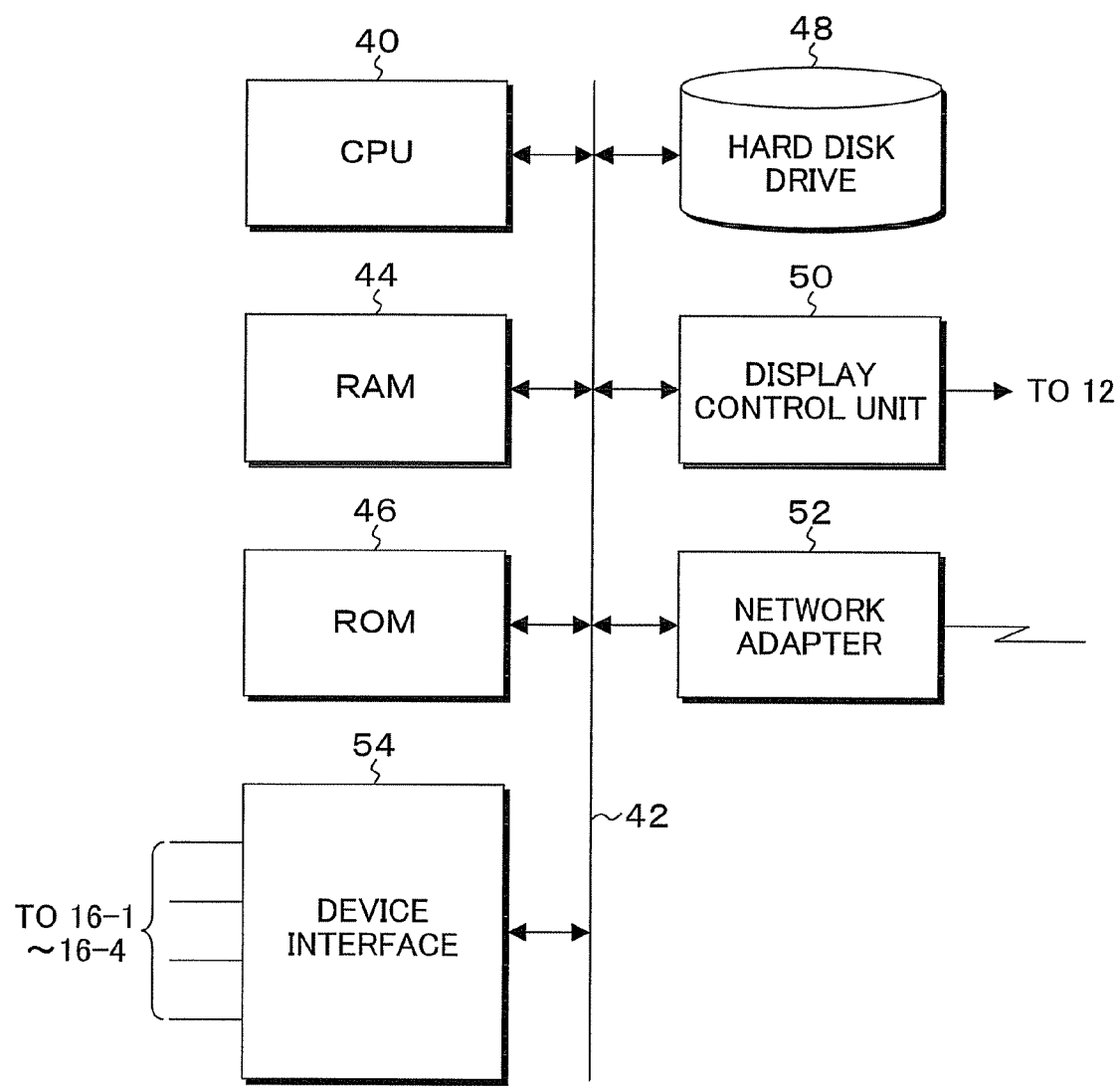
FIG. 3 is a block diagram of a hardware environment of a computer which realizes a controller of FIGS. 1A and 1B.

FIG. 3 is a block diagram of a hardware environment of a computer constituting the controller 14 of FIGS. 1A and 1B. In FIG. 3, a RAM 44, a ROM 46, a hard disk drive 48, a display control unit 50, a network adapter 52, and a device interface 54 are connected to a bus 42 of a CPU 40. The output of the display control unit 50 is given to the display panel 12 of FIGS. 1A and 1B. The network adapter 52 carries out communications with the airline management server 30 and the airport management server 34 via the network 28. The read units 16-1 to 16-4 are connected to the device interface 54. In the hard disk drive 48, programs which realize the functions of the information display unit 22, the user information input unit 24, and the language switch display unit 26 of FIGS. 1A and 1B are stored; and they are read and executed by the CPU 40 after an OS is deployed to the RAM 44 after the computer is activated and booted up.

FIG. 4 is an explanatory drawing of the user database 32 of FIGS. 1A and 1B. In the user database 32, user IDs 56, names 58, addresses 60, flight numbers 62, languages 64, and the like are stored. The data of the user database 32 is registered when users apply for boarding to airline companies, and the flight numbers 62 and the languages 64 used by the users can be acquired by accessing the user database 32 by using the user IDs 56.

Figure 5A:
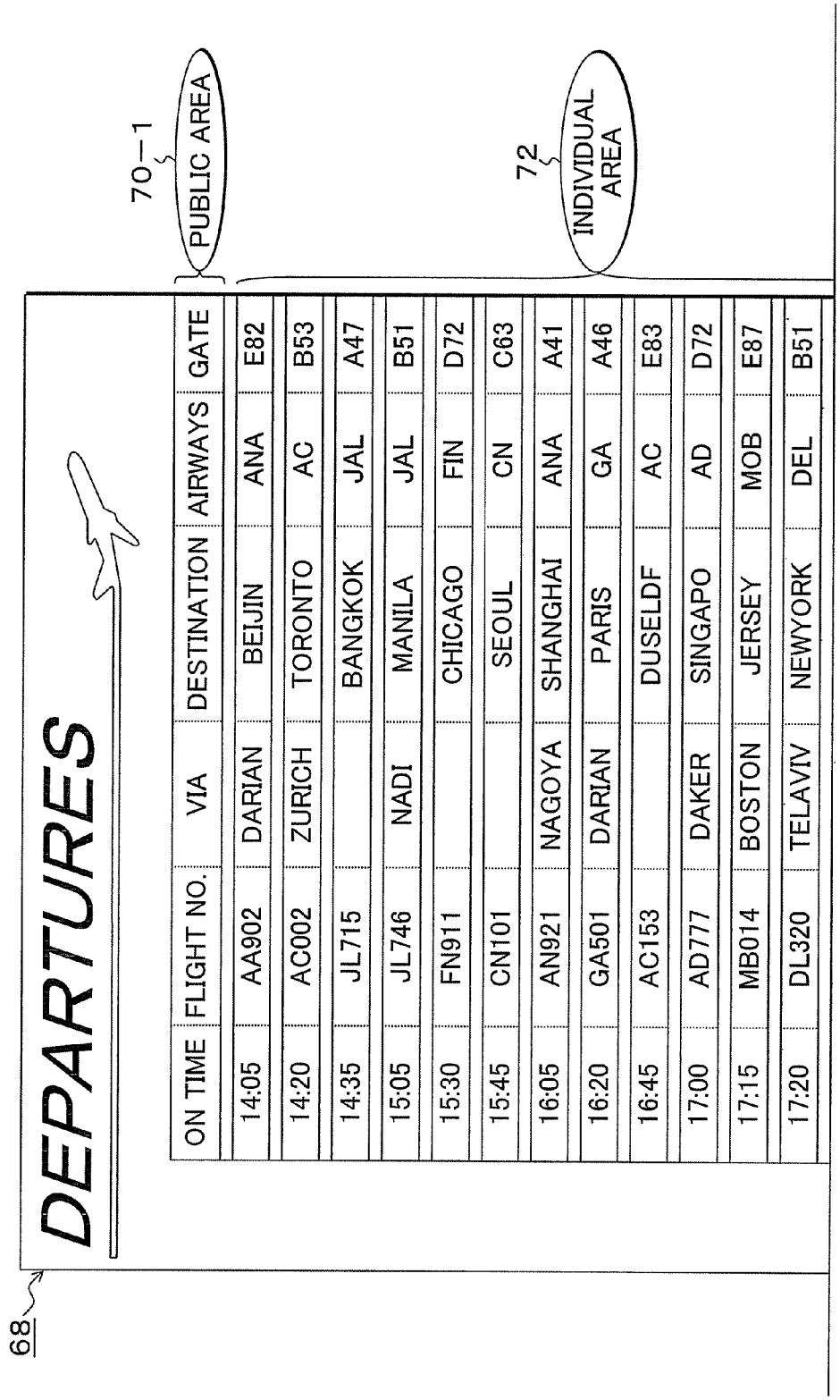

FIGS. 5A and 5B are explanatory drawings of a departure information screen in the present embodiment which is displayed by using English as a standard language. In FIGS. 5A and 5B, for example, "22 Jun. 14:00" is displayed as current time at a lower right part of a departure information screen 68, and the departure flight information after this current time is displayed in a list in English, which is the standard language. An upper part of the list display of the departure information screen 68 is a public area 70-1; and, in the public area 70-1,
ON TIME (departure time),
FLIGHT NO. (flight number),
VIA (route),
DESTINATION (destination),
AIRWAYS (airline company), and
GATE (gate)
are displayed.

An individual area 72 is provided below the public area 70-1, and the departure information of flights are displayed therein in a list in English, which is a standard language, in the order of departure time.

Figure 6A:
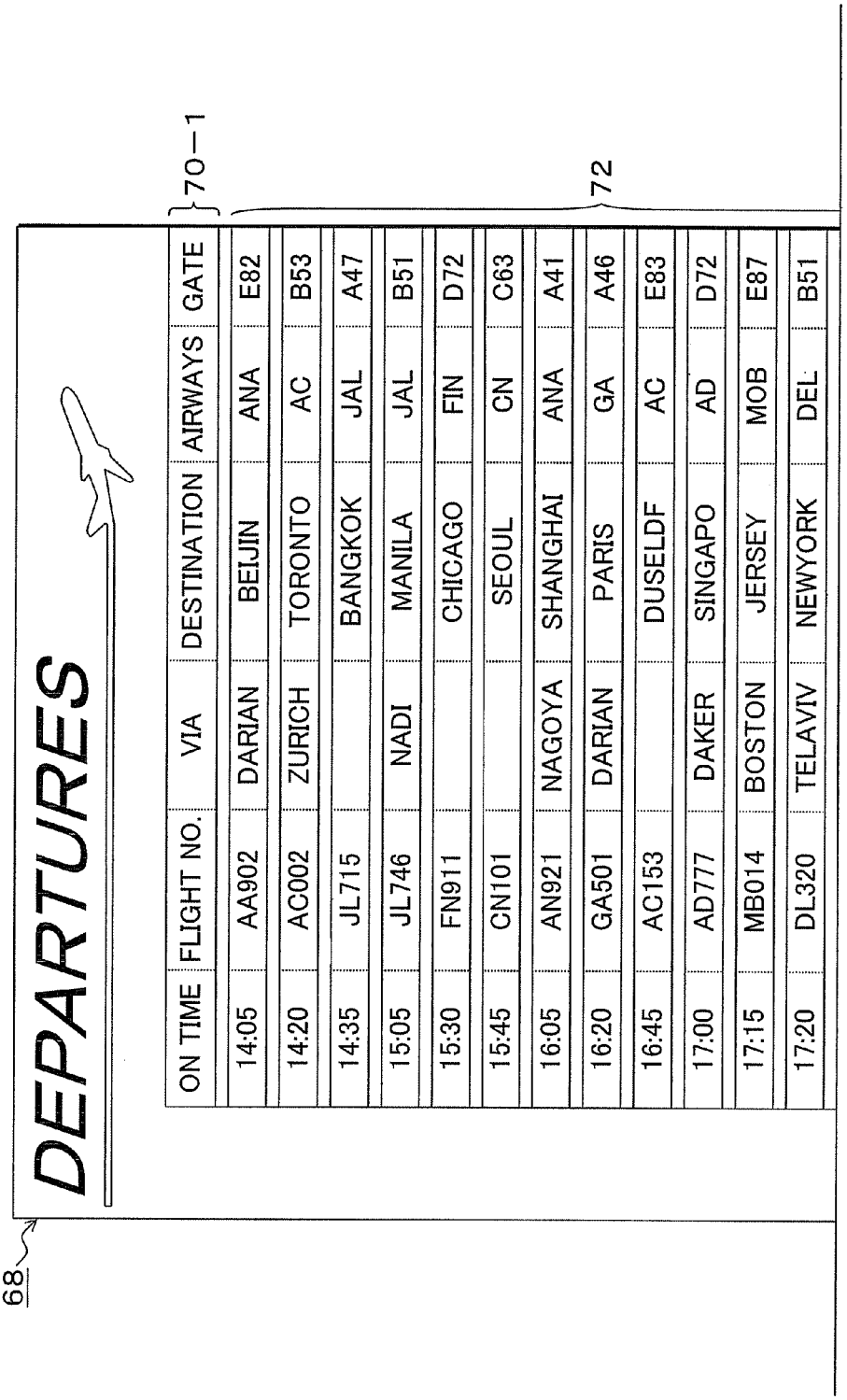

FIGS. 6A and 6B are explanatory drawings of the departure information screen in which approach of a user is detected by the human body sensor 18 of FIGS. 1A and 1B and menus are displayed. In FIGS. 6A and 6B, when approach of the user is detected by the human body sensor 18, menus 72-1 to 72-4 are displayed at the positions which are at a lower side of the departure information screen 68 and corresponding to the read units 16-1 to 16-4 shown in FIG. 2. In the present embodiment, downward arrows showing the positions of the read units 16-1 to 16-4 are displayed in the menus 72-1 to 72-4. As is elucidated in later descriptions, menu contents such as "departure time display" may be displayed in English, which is the standard language, or user used languages as the menus 72-1 to 72-4.

Figure 7A:
Figure 8:
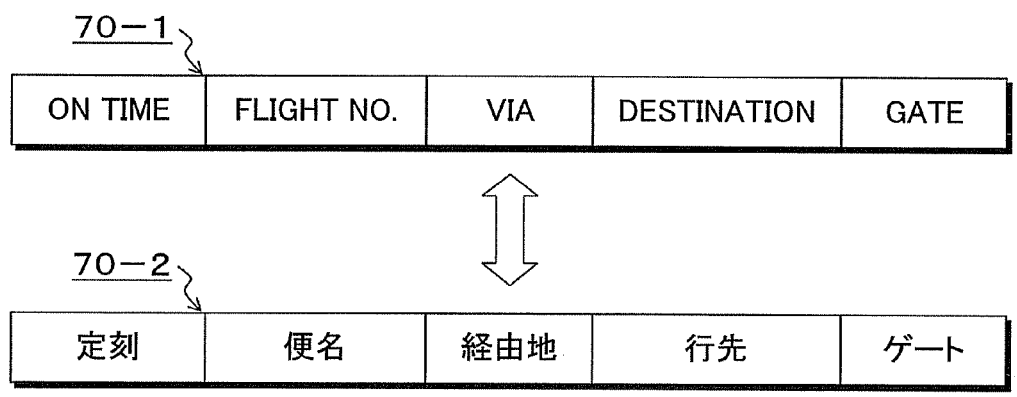
FIG. 8 is an explanatory drawing of time division display by English and Japanese in a public area of FIGS. 7A and 7B.

FIGS. 7A and 7B are explanatory drawings of the departure information screen of the case in which Japanese is determined as a user used language by reading an IC card such as a mileage card that the user has. In FIGS. 7A and 7B, when Japanese is determined as the user used language, Japanese display as shown in a user language public area 70-2 and the original English display of the public area 70-1 shown in FIGS. 6A and 6B are switched by time division. Specifically, as shown in FIG. 8, the display of the public area is time division display wherein the display of the public area 70-1 in English, which is the standard language, and the display of the public area 70-2 in Japanese, which is the user language of the currently accessing user, are switched at a certain time interval.

Figure 9:
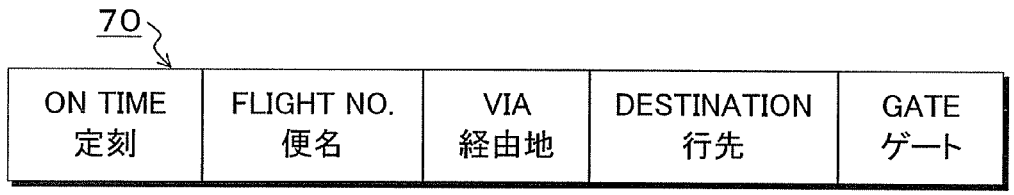
FIG. 9 is an explanatory drawing of space division display by English and Japanese in the public area of FIGS. 7A and 7B.

Also, as shown in FIG. 9, the space division display in which the items of the public area 70 are shown in parallel in English, which is the standard language, and Japanese, which is a user used language, may be employed as the display of the public area.

Referring again to FIGS. 7A and 7B, regarding the individual area 72, for example when "JL715" has been determined as a flight number from the use information of the user, the language display of a user-language-corresponding individual area 74 corresponding to "JL715" which is a third row from the top of the individual area 72 is switched from the previous display in English to the display in Japanese which is the user used language.

Figure 10:
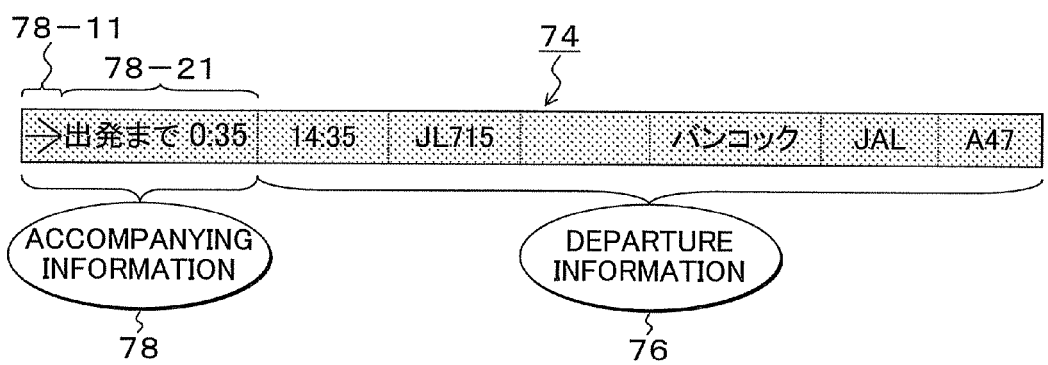
FIG. 10 is an explanatory drawing of Japanese display in a user-language-corresponding area of FIGS. 7A and 7B.

FIG. 10 focuses on and shows the user-language-corresponding individual area 74 of FIGS. 7A and 7B. In FIG. 10, the user-language-corresponding individual area 74 comprises departure information 76 and accompanying information 78. The departure information 76 is the part in which the display in English, which is the standard language, is switched to and displayed by the display in Japanese, which is the user language. In the left side of the departure information 76, the accompanying information 78 is additionally displayed. A mark 78-1 indicating the departure information 76 corresponding to the user and "0:35" which is the remaining time 78-2 from the current time "14:00" until departure time "14:35" are displayed as the accompanying information 78. Furthermore, in the user-language-corresponding individual area 74, any of the following displays is carried out in order to distinguish it from departure information of other individual areas.

(1) Display by a changed color
(2) Display of a mark that draws attention
(3) Flicker display In FIG. 10, the user-language-corresponding individual area 74 is displayed by changing the color to a particular color, for example, "red". Corresponding to the change of the color of the user-language-corresponding individual area 74, the user language public area 70-2 of FIGS. 7A and 7B may be also changed to the same color as the user-language-corresponding individual area 74 at the timing of Japanese display of time division display so as to draw attention. In the mobile phone 25 of FIGS. 1A and 1B, a display 25-1 is provided; therefore, when the user-language-corresponding individual area 74 is displayed in the individual area by a particular color as shown in FIGS. 7A and 7B by the controller 14, the same color may be displayed in the display 25-1 of the mobile phone 25. As a result, the user can clearly see the departure flight information that the user is to watch since the color same as the color of the user-language-corresponding individual area 74 of the departure information screen 68 is displayed in the display 25-1 when the user accesses it by the mobile phone 25. Such display of color in a device of the user side can be similarly applied, for example, also to the IC card 15 if it has a display. Moreover, in the user-language-corresponding individual area 74 of FIG. 10, attention of the user is drawn by adding the mark 78-1 to the accompanying information 78, and this mark display can be also displayed at the same time in the display 25-1 of the mobile phone 25 of FIGS. 1A and 1B by which the user made access so as to draw attention. Furthermore, the user-language-corresponding individual area 74 is caused to flicker, so that the user can easily see the corresponding information. As a matter of course, any one of or a combination of the color change, mark display, and flicker display of the user-language-corresponding individual area 74 can be employed.

Figure 11:
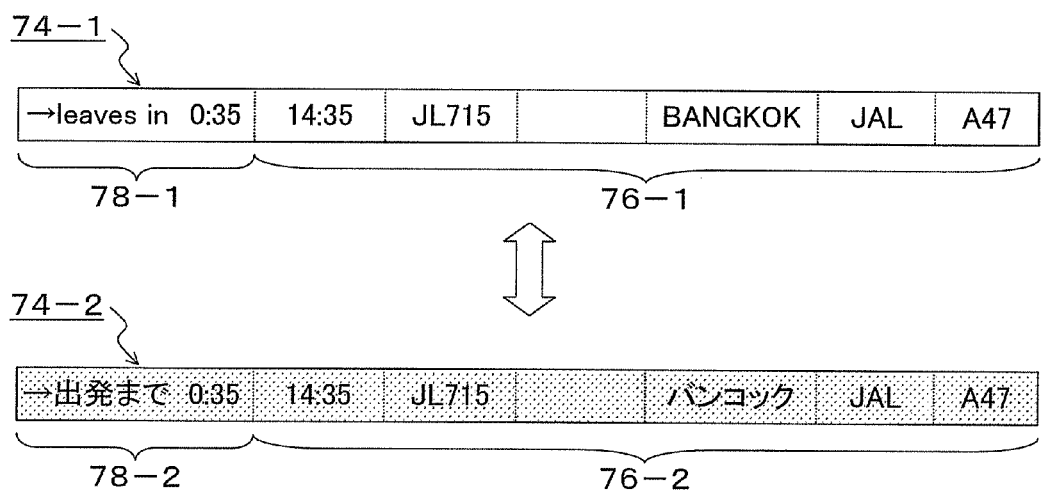
FIG. 11 is an explanatory drawing of time division display of English and Japanese in the user-language corresponding individual area of FIGS. 7A and 7B of the case in which two users of English and Japanese are determined.

FIG. 11 is an explanatory drawing of time division display of English and Japanese in the user-language-corresponding individual area 74 of FIGS. 7A and 7B of the case in which two users of English and Japanese are determined in the present embodiment. In FIG. 11, a user-language-corresponding individual area 74-1 is the display corresponding to the user of English, and this is the original display of English, which is the standard language, in an initial screen.

On the other hand, a user-language-corresponding individual area 74-2 is the display corresponding to the user of Japanese. When the user of English and the user of Japanese have redundantly accessed the same departure flight "JL715", the display of the departure flight of the same individual area is caused to be time division display in which the displays of the English user-language-corresponding individual area 74-1 and the Japanese user-language-corresponding individual area 74-2 of FIG. 11 are switched at a certain time interval. Note that, in FIG. 11, a space division display in which the information of the user-language-corresponding areas of English and Japanese is shown in combination may be employed; however, time division processing is more desirable since other departure flight information which is adjacent thereto is masked if the space division display is employed. As a matter of course, in the case in which masking other departure information is not problematic, the display by space division may be employed.

Figure 12A:
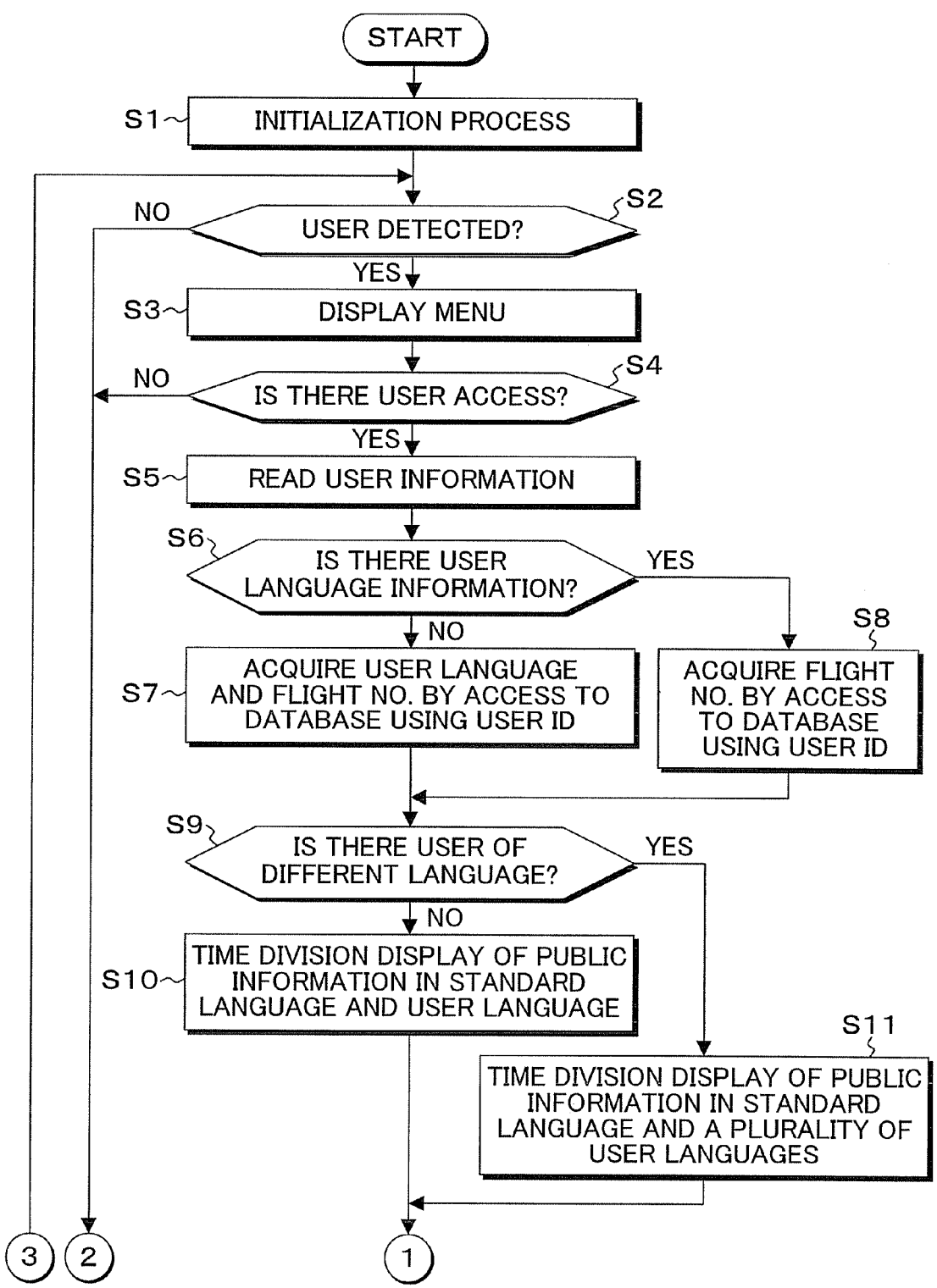
FIGS. 12A and 12B are flow charts of an information display process according to the present embodiment.
Figure 12B:
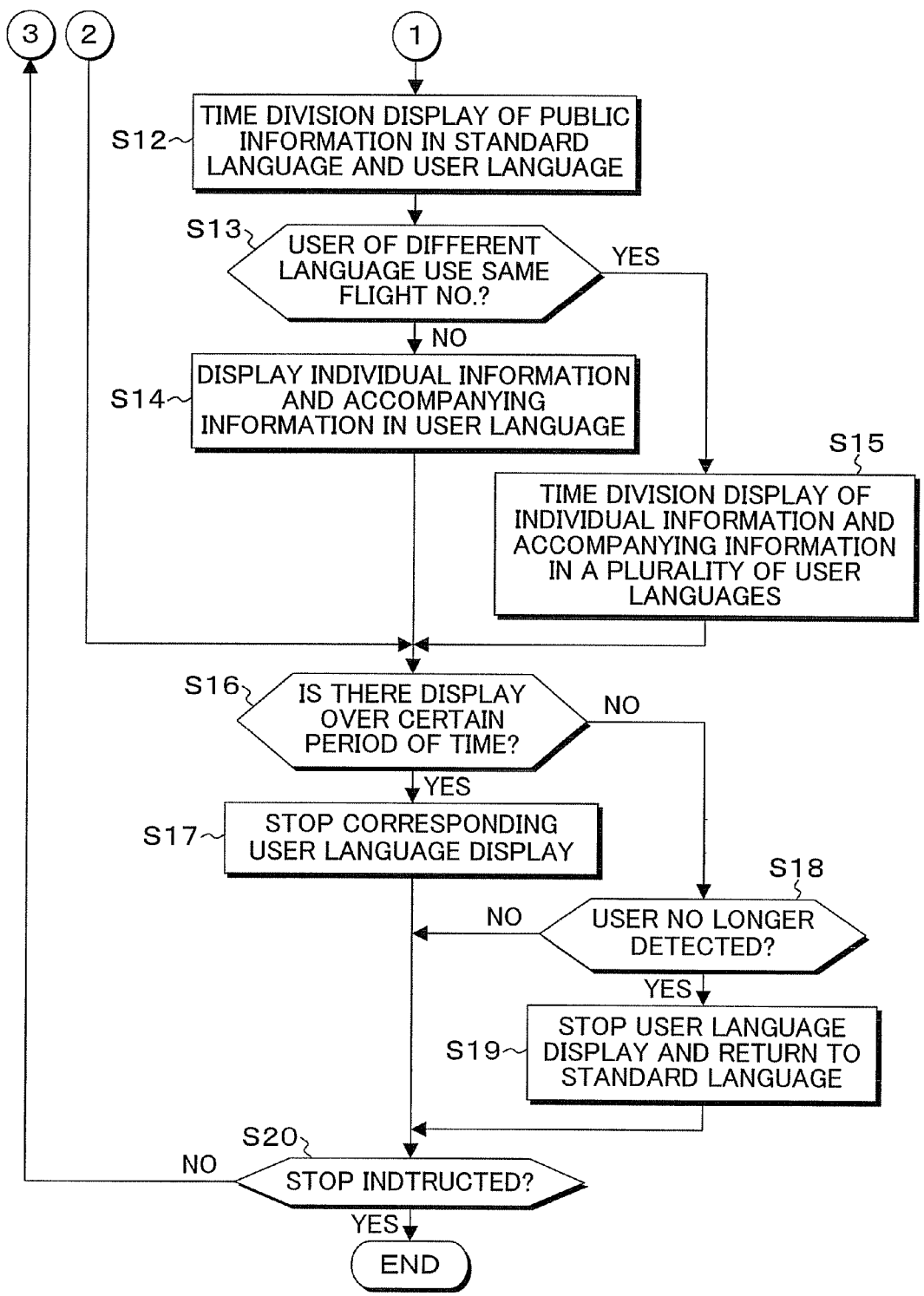

FIGS. 12A and 12B are flow charts of an information display process according to the present embodiment, and it will be explained below with reference to FIGS. 1A and 1B. In FIGS. 12A and 12B, when power of the large screen display device 10 is turned on, a predetermined initialization process is carried out in step S1. Subsequently, whether a user is detected or not by the human body sensor 18 is checked in step S2; and, when a user is adjacent thereto and detected, the process proceeds to step S3, wherein, corresponding to the read units 16-1 to 16-4, a plurality of menus are displayed in the display panel 12. Subsequently, when user access is determined in step S4, the process proceeds to step S5, wherein user information is read from, for example, the IC card 15 for mileage that the user has. Subsequently, in step S6, whether the language information of the user is in the read user information or not is checked. If the language information is not there, in step S7, access to the airline management server 30 is made via the network 28 by a user ID, and the user language and flight number are acquired by referencing the user database 32. Meanwhile, if there is the user language information in step S6, in step S8, the flight number is acquired from the user database 32 by similarly accessing the airline management server 30 by the user ID. Next, in step S9, based on the acquired user language, the public area 70 of the display panel 12 is displayed, for example, by time division by the standard language and the user language. As a matter of course, it may be displayed by space division of the standard language and the user language. Next, in step S13, whether there is a usage of the same flight number by a user of another language or not is checked; and, if not, the individual information and accompanying information corresponding to the flight number is displayed in the user language in step S14. On the other hand, if there is a usage of the same flight number by a user of another language in step S13, the process proceeds to step S15, wherein the individual information and the accompanying information of the corresponding flight number is displayed by time division by the language of the currently accessing user and the language of the user who has already accessed. Subsequently, in step S16, whether there is a display which is based on a user access and has been displayed over a certain period of time is checked; and, if there is the display which has been displayed over a certain period of time, the corresponding display by the user language is stopped in step S17. When presence of the user is no longer detected by the human body sensor in step S18, the display in the user language is stopped and it is returned to the display in the standard language in step S19. If there is no user detection in step S2, the processes of steps S3 to S14 are skipped, and the process proceeds to step S17. Such processes of steps S2 to S19 are repeated until there is a stop instruction in step S20.

FIGS. 13A and 13B are explanatory drawings of an embodiment in which menus are displayed in a plurality of languages in a departure information display screen. In FIGS. 13A and 13B, when approach of a user is detected by the human body sensor 18 in the large screen display device 10 of FIGS. 1A and 1B, menus 72-11 to 72-14 are displayed at the positions corresponding to the read units 16-1 to 16-4 at a lower part of the departure information screen 68. Among the four menus 72-11 to 72-14, English, which is the standard language, is displayed in the top menu 72-11 in the present embodiment. In the rest of the menus, 72-12 to 72-14, menu display is carried out in the languages selected from user languages such as Japanese, Chinese, and French. When the menus 72-11 to 72-14 are displayed in this manner in predetermined particular languages, such as Japanese, Chinese, and French in addition to English, which is the standard language, at a lower side of the departure information screen 68, a user can see the menu of the language matching the user and bring the IC card 15 or the mobile phone 25 close to the corresponding read unit so that the departure information is displayed in the language that the user can use based on reading of the user information. As another embodiment in which menus are displayed in a standard language and user languages in FIGS. 13A and 13B, the first menu 72-11 is fixedly displayed in English, which is the standard language, and the second menu 72-12 is fixedly displayed in a most frequently used user language, for example, Japanese. The remaining third and fourth menus 72-13 and 72-14 are menu displayed in dynamic languages based on usage frequencies. Specifically, used languages of users who used the departure information screen are statistically counted, a most frequently used language and a second-most frequently used language are selected from among them for the user languages other than English and Japanese of the fixedly displayed menus 72-11 and 72-12 at predetermined update timing, for example, the timing once a day or once a week, and the selected user languages are displayed in the menus 72-13 and 72-14. As a result, language displays of the menus corresponding to the usage frequencies of the user languages at that point can be carried out, and the user friendliness can be further improved by prioritizing the displays in the languages used by many users.

Figure 14:
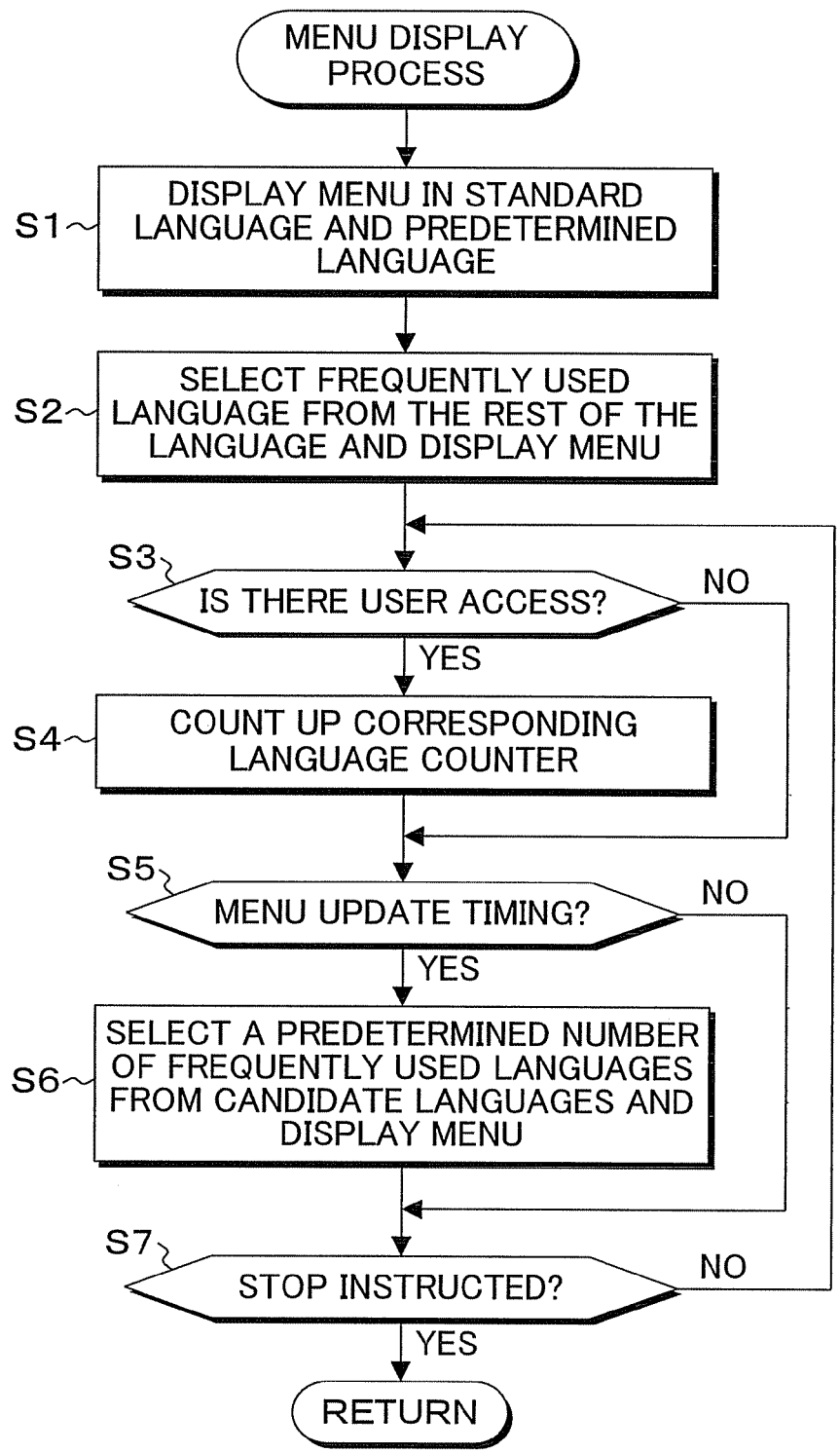
FIG. 14 is a flow chart of a menu display process which dynamically changes the display languages of menus in accordance with usage frequencies of users.

FIG. 14 is a flow chart of a menu display process which dynamically changes the display languages of the menus in accordance with the frequencies of user used languages. In FIG. 14, in the menu display process, in step S1, menus are displayed fixedly in the standard language and the predetermined language, and then, in step S2, frequently used languages are selected from the rest of the languages so as to display menus. Subsequently, every time user access is made in step S3, a corresponding language counter is counted up in step S4. Subsequently, when menu update timing which is determined in advance is determined in step S5, the process proceeds to step S6, wherein a predetermined number of languages are selected from the candidate languages at that point in the descending order of usage frequencies, and the menus which are subjected to dynamic display are displayed in the selected languages. Such processes of steps S1 to S6 are repeated until there is a stop instruction in step S7.

Figure 15:
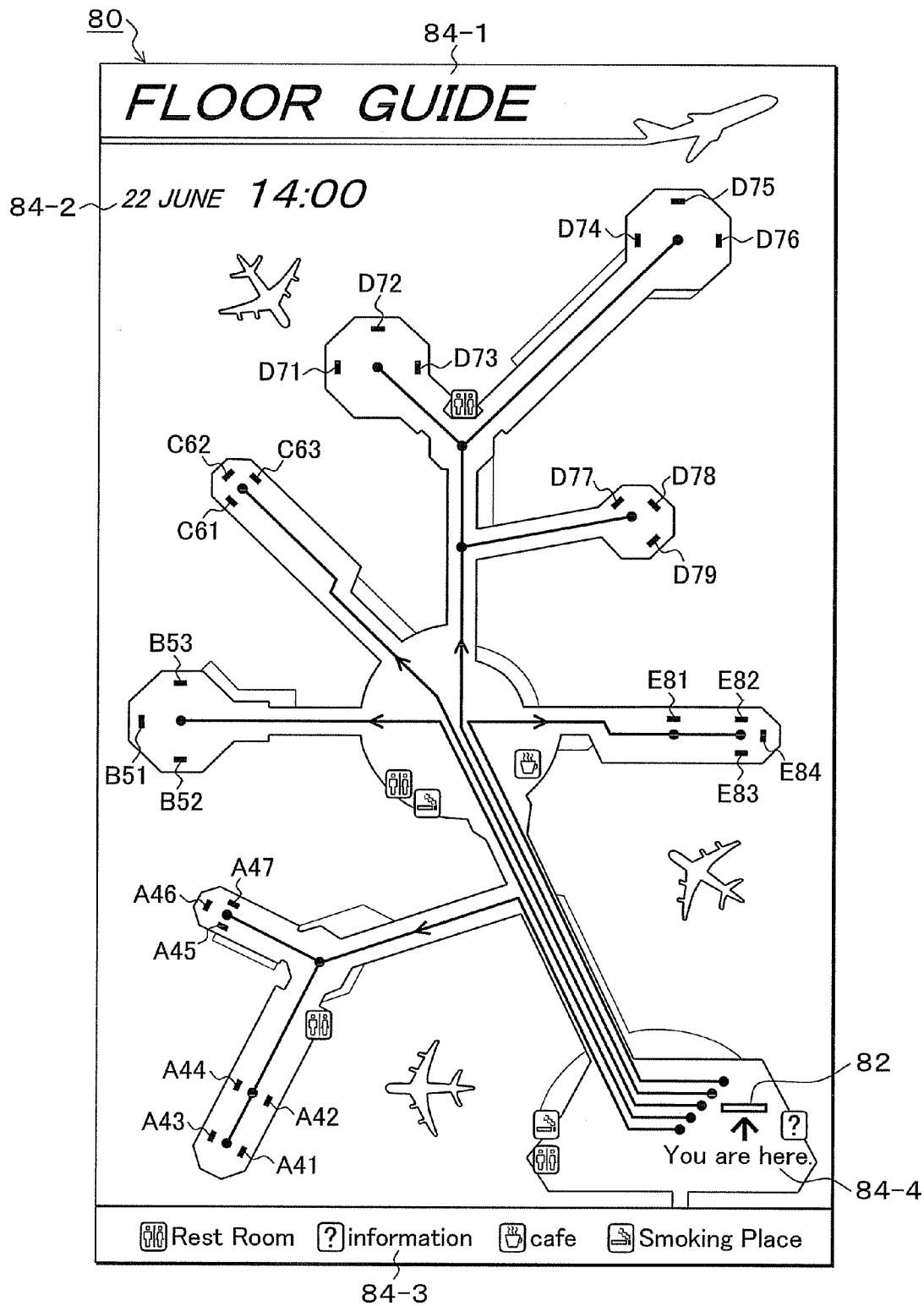
FIG. 15 is an explanatory drawing of a gate guide screen shown by using English as a standard language.

FIG. 15 is an explanatory drawing of a gate guide screen showing a guide map of departure flight gates of a terminal by using English as a standard language to be displayed in the large screen display device 10 of FIGS. 1A and 1B. In FIG. 15, a map of departure gates are shown in the gate guide screen 80; and, on the map, a current position shown by a current position display unit 82, gate numbers A41, A42, A43, A44, A45, A46, A47, . . . showing the positions of boarding gates, and the like are shown. In the gate guide screen 80, public areas 84-1 to 84-4 are provided. The public area 84-1 shows a title of the gate guide screen, and "FLOOR GUIDE" is shown in English, which is the standard language. The public area 84-2 shows the current time. The public area 84-3 shows descriptions of symbols on the guide map. Furthermore, the public area 84-4 shows a linguistic display showing the current position, and "You are here" is shown when the standard language is English.

Figure 16:
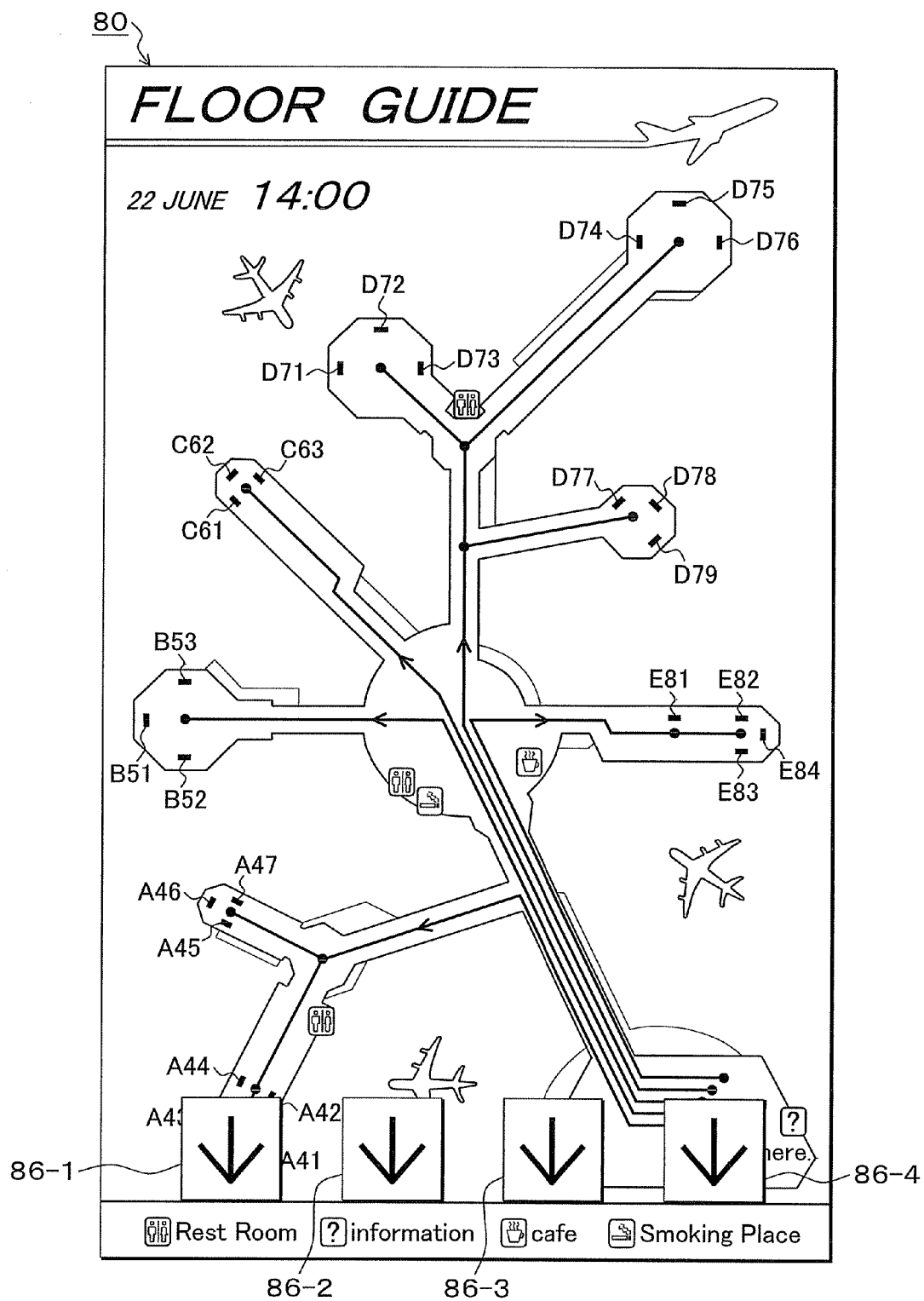
FIG. 16 is an explanatory drawing of a gate guide screen in which approach of a user is detected by a human body sensor and menus are displayed.

FIG. 16 is an explanatory drawing of a gate guide screen in which approach of a user is detected by the human body sensor 18 of FIGS. 1A and 1B and menus are displayed. When approach of the user is detected by the human body sensor 18, menus 86-1 to 86-4 are displayed in a lower part of the gate guide screen so as to correspond to the read units 16-1 to 16-4 of FIG. 2. As a result, the user can cause any of the arbitrary read units 16-1 to 16-4 indicated by the menus 86-1 to 86-4 to read user information by causing, for example, an IC card to be close thereto.

Figure 17:
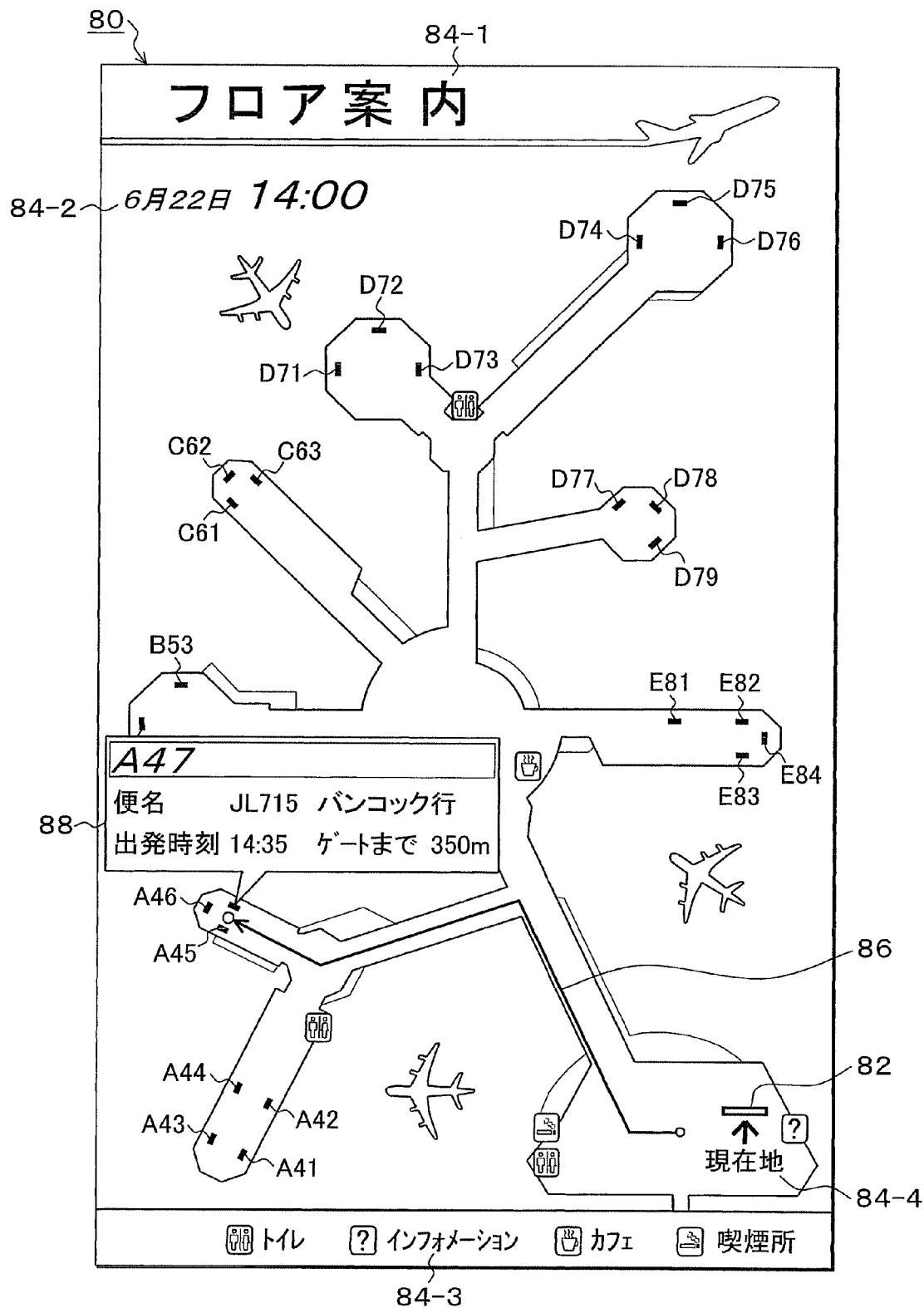
FIG. 17 is an explanatory drawing of the gate guide screen of the case in which Japanese is determined from user information.

FIG. 17 is an explanatory drawing of the gate guide screen of the case in which Japanese is determined from read user information. Since Japanese is determined as a user language, in the gate guide screen 76 of FIG. 17, the public areas 84-1 to 84-4 are switched from the display of FIG. 15 in English, which is the standard language, to a display in Japanese, which is the user language. Note that the language displays of the public areas 84-1 to 84-4 are displayed by time division by English, which is the standard language, and Japanese, which is the user language. Alternatively, English, which is the standard language, and Japanese, which is the user language, can be shown in combination by space division. Meanwhile, when, for example, "JAL715" is determined as a flight number from the user information, the corresponding boarding gate "A47" is determined, and a user corresponding route 86 from the current position display unit 82 to the gate "A47", which is obtained from the user information, is shown as individual information. Furthermore, as accompanying information 88 with respect to the departure gate "A47", the flight number, destination, departure time, and distance to the gate are shown in Japanese, which is the user language.

Figure 18:
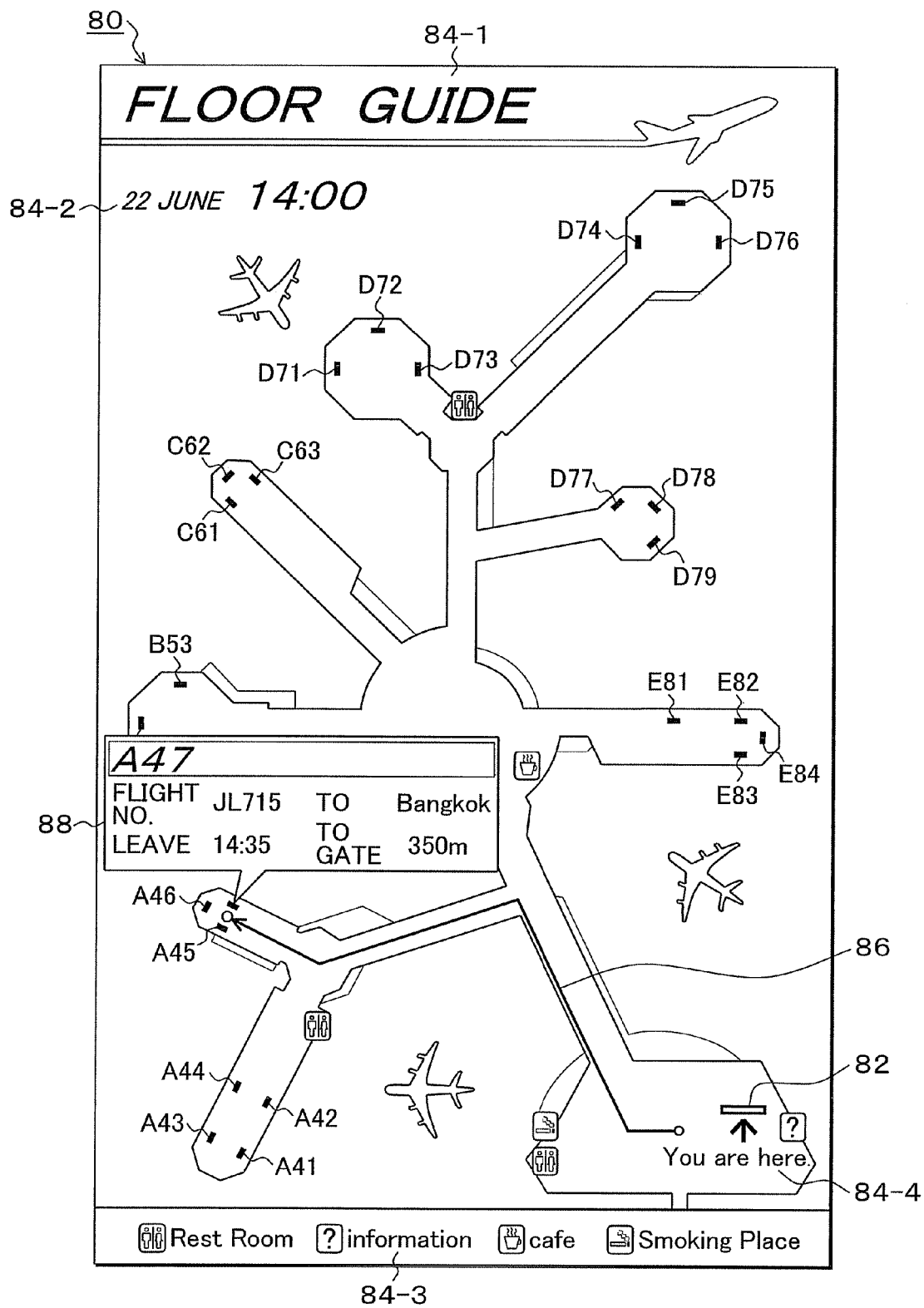
FIG. 18 is an explanatory drawing of the gate guide screen of the case in which English is determined from user information.

FIG. 18 is an explanatory drawing of the gate guide screen of the case in which English is determined from the user information. In the gate guide screen of FIG. 18, since the user language is English, which is the standard language, the displays of the public areas 84-1 to 84-4 remain in the English displays of the initial screen shown in FIG. 15; however, since the departure gate "A47" corresponding to the departure flight "JL715" is determined from the user information, the user corresponding route 86 from the current position display unit 82 to the boarding gate A47 is displayed. At the same time, in the vicinity of the boarding gate "A47", the flight number, destination, departure time, and distance to the gate are displayed as accompanying information 88 in English, which is the user language (in this case, same as the standard language). Furthermore, in the gate guide screen 80, when two users of English and Japanese access it at the same time, the time division display in which the Japanese display and English display of the public areas 84-1 to 84-4 in FIG. 17 and FIG. 18 are switched in a certain time interval is carried out, and user corresponding routes are displayed in the user languages respectively for the users. If the two users use the same gate, although the user corresponding route 86 is fixedly displayed, the accompanying information 88 is displayed by time division in which the Japanese display and the English display are switched at a certain time interval or displayed by space division. As a matter of course, when the users who access the same gate at the same time are increased, and the users of, for example, English, Japanese, Chinese, and German use it, the public areas 84-1 to 84-4 and the accompanying information 88 are displayed by time division in which the user languages are switched at a certain time interval or displayed by space division in which the areas are divided into the number of languages supported at the same time. In the above described embodiments, the embodiments in which the departure information and the departure gate guide map of an air terminal is used as display information are taken as examples; however, as another embodiment, in utilization of facilities such as a railroad station, ballpark, and theater, language information can be read from the information of an issued ticket or admission card, and the corresponding guide information can be displayed in the user language. However, in the information of, for example, tickets or admission cards, the user ID is not registered like the IC card 15 or the mobile phone 25 of the air terminal, and the user used language cannot be acquired by access to a database according to the user ID. In such cases, when the information of, for example, a ticket or admission card is set and used first in a used terminal, a language setting menu screen is displayed in the used terminal; and, when a used language of the user is selected therefrom, the used language is written to the card. When the language information is read by setting the ticket or admission card, in which the user used language is written in this manner, in the large screen display device 10 of the present embodiment, for example, a destination platform which is an object in a site map of a station corresponding to the user language or a reserved seat of the user of a ballpark, theater, or the like can be displayed in the set language of the user read from the card. The present embodiment also provides an information display program executed by the computer of FIG. 3 to which the controller 14 of FIGS. 1A and 1B is applied, and the information display program basically has the processing contents shown in the flow chart of FIGS. 12A and 12B. Note that, in the present embodiments, the IC card or the mobile phone using the noncontact communication method has been taken as an example of a device that the user has for reading user information; however, a magnetic card in which the user information is magnetically recorded in a tape medium of the card can be also used. When the magnetic card is to be used, magnetic card readers are provided as read units of the large screen display device 10 of FIGS. 1A and 1B. The present embodiments take the guide displays in, for example, an air terminal, station, ballpark, or theater as examples; however, the present invention is not limited thereto and can be applied without modification to an information display device using a large screen in an environment such as an international event or a sports convention where the device is seen by many users of different linguistic areas. The present invention includes arbitrary modifications that do not impair the objects and advantages thereof, and the invention is not limited by the numerical values shown in the above described embodiments.

The invention claimed is:

1. An information display system, comprising
a large screen display device;
an information display unit which displays information in the screen display device in a predetermined standard language;
a user information input unit which inputs user information including information of a language desired by a user; and
a language switch display unit which, when the user desired language input by the user information input unit is different from the standard language, switches all or part of the standard language of the screen display device to and displays the desired language of the user, and
wherein the information display unit displays guide information, which comprises a public area common to all users and a plurality of individual areas dependent on respective users, in the standard language,
when the input user desired language is different from the standard language, the language switch display unit displays the public area by time division by the standard language and the user desired language or displays the standard language and the user desired language in parallel by the area division and switches an individual area corresponding to the user desired language, and
wherein the language switch display unit displays accompanying information relevant to the user in the language of the user so as to correspond to the individual area switched to and displayed in the user desired language.

2. The information display system according to claim 1, wherein the language switch display unit subjects an individual area to display by a predetermined color, flicker display, or accompanying display of a symbol or a character with respect to the individual area corresponding to the user desired language in synchronization with the switch display to the user desired language, so as to draw attention of the user.

3. The information display system according to claim 1, wherein the language switch display unit causes the accompanying information to draw attention by an identification means equivalent to the individual area in synchronization with the switch display to the user desired language.

4. The information display system according to claim 2, wherein the language switch display unit causes the display of the user desired language among the standard language and the user desired language displayed by the time division or area division to draw attention by an identification means equivalent to the individual area in synchronization with the switch display to the user desired language.

5. The information display system according to claim 1, wherein the information display unit displays a list in a tabular form as the guide information, displays item names of items of a table as a public area of the list display, and displays a plurality of arrays of item values corresponding to the item names of the public area as individual areas of the list display.

6. The information display system according to claim 1, wherein the information display unit displays a list of departure information of a transportation facility as the guide information, displays item names including, for example, departure time, flight number, route, destination, and company name as a public area of the list display, and displays a plurality of arrays of item values corresponding to the item names of the public area as individual areas of the list display.

7. The information display system according to claim 1, wherein the information display unit displays a list of departure information of an airport as the guide information, displays item names including, for example, departure time, flight number, route, destination, company name, and gate number as a public area of the list display, and displays a plurality of arrays of item values corresponding to the item names of the public area in the order of departure time as individual areas of the list display.

8. The information display system according to claim 1, wherein the information display unit displays map information of facilities as the guide information, displays at least a description on the guide map as a public area of the map information, and displays a position on the map desired by the user and information accompanying the position as individual areas of the map information.

9. The information display system according to claim 1, wherein the information display unit displays a map showing boarding gates of an airport as the guide information, displays the title, a current position, and a symbol description on the guide map as public areas of the map, and displays information of the boarding gate to be used by the user as an individual area of the map.

10. The information display system according to claim 1, wherein the user information input unit reads information of the language desired by the user from an information device that the user carries.

11. The information display system according to claim 1, wherein the user information input unit reads identification information of the user from an information device that the user carries, accesses a database managing the identification information, and acquires the information of the language desired by the user.

12. The information display system according to claim 1, wherein the user information input unit has a plurality of read units having menu screens for reading the user information, displays menu information in a plurality of languages including the standard language respectively in the plurality of menu screens, and, when the language determined by reading the user information by the read unit is different from the display language of the menu screen, displays the display language of the menu screen and the determined user desired language by time division or area division.

13. The information display system according to claim 1, wherein the user information input unit has a plurality of read units having menu screens for reading the user information, fixedly displays menu information in part of the menu screens of the plurality of read units in the standard language and a predetermined user desired language, and dynamically displays menu information in a frequently used user desired language in the rest of the plurality of menu screens of the read units.

14. The information display system according to claim 1, wherein, when input of another user language is determined during display in the user desired language, the language switch display unit displays a public area by time division or area division by the standard language and the plurality of user desired languages and displays an individual area by time division or area division by the plurality of user desired languages.

15. The information display system according to claim 1, wherein the language switch display unit returns the display to the display of the standard language after a certain time period has elapsed after the display is switched to the display of the user desired language.

16. The information display system according to claim 1, wherein the language switch display unit detects that the user is away from the vicinity of the screen display device by a sensor and returns the display of the user desired language to the display of the standard language.

17. An information display method comprising
displaying information in a large screen display device in a predetermined standard language;
inputting user information including information of a language desired by a user; and
implementing a language switch display, when the user desired language input in said inputting of the user information is different from the standard language, by switching all or part of the standard language of the screen display device to and displaying the desired language of the user, and
wherein in the displaying of the information, guide information, which comprises a public area common to all users and a plurality of individual areas dependent on respective users, is displayed in the standard language; and,
when the user desired language is different from the standard language, in the language switch display, the public area is displayed by time division by the standard language and the user desired language or displays the standard language and the user desired language in parallel and areas an individual area corresponding to the user is switched from the standard language to the user desired language; and
wherein the executing of the language switch display includes providing accompanying information relevant to the user in the language of the user so as to correspond to the individual areas switched to and displayed in the user desired language.

18. A non-transitory computer readable storage medium, which stores an information display program which causes a computer to execute, comprising:
displaying information in a large screen display device in a predetermined standard language;
inputting user information including information of a language desired by a user; and
executing a language switch display, when the user desired language input in said inputting of the user information is determined to be different from the standard language, by switching all or part of the standard language of the screen display device to and displaying the desired language of the user, and
wherein in the display of the information, guide information, which comprises a public area common to all users and a plurality of individual displays dependent on respective users, is displayed in the standard language; and,
when the user desired language is different from the standard language, in the language switch display, the public area is displayed by time division by the standard language and the user desired language or displays the standard language and the user desired language in parallel by the area division and an individual area corresponding to the user is switched from the standard language to the user desired language; and
wherein the executing of the language switch display includes providing accompanying information relevant to the user in the language of the user so as to correspond to the individual areas switched to and displayed in the user desired language.

* * * * *